United States Patent [19]

Yasuta et al.

[11] 4,394,402
[45] Jul. 19, 1983

[54] PROCESS FOR TREATING ACETYLENE POLYMER OR DOPED ACETYLENE POLYMER

[75] Inventors: Naoshi Yasuta, Yokohama; Yoshio Matsumura, Yamato; Teizo Kotani, Yokohama, all of Japan

[73] Assignee: Japan Synthetic Rubber Co., Ltd., Tokyo, Japan

[21] Appl. No.: 265,186

[22] Filed: May 19, 1981

[30] Foreign Application Priority Data

May 21, 1980 [JP] Japan .................................. 55-66555

[51] Int. Cl.³ .............................................. B05D 3/06
[52] U.S. Cl. ....................................... 427/40; 427/41; 427/222; 427/255.6; 427/296; 427/322
[58] Field of Search ................ 427/41, 40, 222, 255.6, 427/296, 322

[56] References Cited

U.S. PATENT DOCUMENTS 3,518,108 6/1970 Heiss et al. ............................ 427/41

Primary Examiner—Bernard D. Pianalto
Attorney, Agent, or Firm—Oblon, Fisher, Spivak, McClelland & Maier

[57] ABSTRACT

A process for treating an acetylene polymer or a doped acetylene polymer, which comprises plasma-polymerizing a gasifiable organic compound under plasma-excitation under reduced pressure, thereby forming a polymer film on the solid surface of an acetylene polymer or a doped acetylene polymer placed in said polymerization reaction system. This process can prevent the acetylene polymer or doped acetylene polymer from being deteriorated owing to oxidation.

11 Claims, 3 Drawing Figures

PROCESS FOR TREATING ACETYLENE POLYMER OR DOPED ACETYLENE POLYMER

BACKGROUND OF THE INVENTION:

1. Field of the invention:

The present invention relates to a process for treating an acetylene polymer or a doped acetylene polymer by plasma-polymerization.

Acetylene polymers are a semi-conductor or an insulator having a specific resistance in the order of $10^5$ $\Omega$.cm to $10^9$ $\Omega$.cm [see Makromol. Chem., Vol. 175, p. 1565 (1978)]. It has been well-known that the electrical conductivity of an acetylene polymer can be increased remarkably by doping the acetylene polymer with iodine ($I_2$), arsenic pentafluoride ($AsF_5$) or the like [for instance, see J. Amer. Chem. Soc., Vol. 100, p. 1013 (1978)]. At present, attention is paid to said doped acetylene polymer as a new organic conductive material. However, an acetylene polymer or a doped acetylene polymer tends to react with oxygen, and when exposed in the air, said acetylene polymer or doped acetylene polymer is deteriorated by oxidation and the electrical resistance thereof increases greatly.

Deterioriation of the acetylene polymer or doped acetylene polymer by oxygen has been a great problem in the use of the acetylene polymer or doped acetylene polymer.

2. Description of the Prior Art:

Heretofore, a casting method, a chemical vapor deposition method (CVD method) and the like have been known as a coating method for the material protection. Among them, the casting method comprises coating a high molecular weight polymer solution on a solid surface, and then vaporizing the solvent to form a film of the high molecular weight polymer. This method has such defects that the adhesive strength between the film of a high molecular weight polymer and the substrate is weak, and so the film is apt to be peeled off. Another defect in this method is that the kind of the polymer is restricted because of the necessity of dissolving the high molecular weight polymer in a solvent.

Further, the CVD method is a method by which gasified reactants are subjected to chemical reaction in the gas phase or on the surface of a substrate, thereby depositing a new layer on the substrate surface. Like the casting method, this method has also the defects that the adhesive strength between the new layer and the substrate is weak, that the reaction proceeds spontaneously and hence the control of the reaction is difficult and the formation of a uniform layer is difficult and that the kind of reaction is restricted.

SUMMARY OF THE INVENTION

An object of this invention is to provide a process for treating an acetylene polymer or a doped acetylene polymer to prevent the acetylene polymer or the doped acetylene polymer from being deteriorated by oxidation.

According to this invention, there is provided a process for treating an acetylene polymer or a doped acetylene polymer, which comprises plasma-polymerizing a gasifiable organic compound under plasma-excitation under reduced pressure, thereby forming a plasma polymer film on the solid surface of the acetylene polymer or doped acetylene polymer placed in the plasma-polymerization reactor.

According to this invention, the polymer film formed by plasma-polymerization is firmly bonded to the acetylene polymer or the doped acetylene polymer and said film is a uniform film having a very low oxygen-permeability. In addition, since the film is formed in such an atomosphere that oxygen is substantially absent, the acetylene polymer or the doped acetylene polymer can be prevented from being deterioriated by oxidation. Accordingly, the increase in electrical resistance of the acetylene polymer or the doped acetylene polymer can be prevented.

DETAILED DESCRIPTION OF THE PREFERRED EMBODIMENTS

Figure 1:
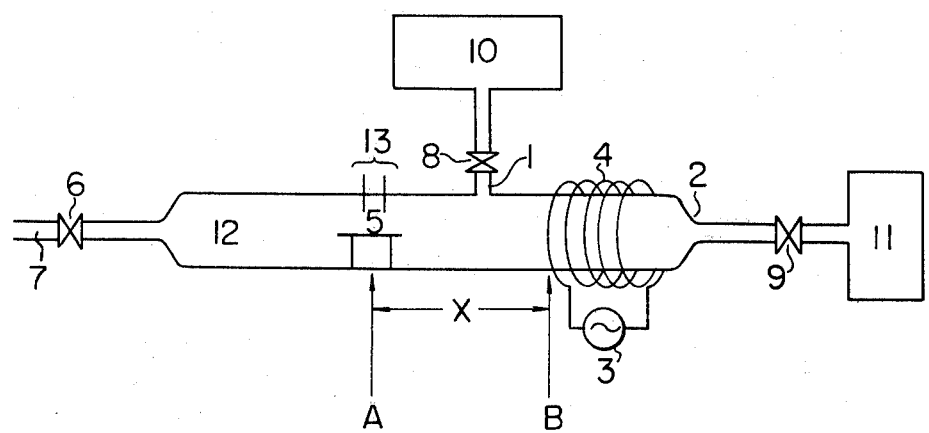

The kind of the acetylene polymer used in this invention is not critical, and there may be used an acetylene polymer obtained according to the process disclosed in, for example, Japanese Patent Publication No. 32581/73, that is, a filmy or fibrous acetylene polymer obtained by conducting the polymerization using a catalyst uniformly soluble in a suitable solvent at the interface in the neighborhood of the free surface between the catalyst solution and the gaseous acetylene or on the solid surface of a metal, glass and the like on which the catalyst solution is coated.

Further, the kind of the doped acetylene polymer used in this invention is neither critical, and there may be used a doped acetylene polymer obtained according to the process disclosed in, for example, European Patent Publication No. 0,022,271 Al, by which an acetylene polymer is treated with a solution of a Platinum Group metal complex which is active to substitution reaction with olefins in an organic solvent, or with a solution of a carbonium salt or an oxonium salt in an organic solvent, or acetylene polymers doped with a conventional dopant, for example, hydrogen bromide (HBr), chlorine ($Cl_2$), bromine ($Br_2$), iodine ($I_2$), iodine chloride (ICl), iodine bromide (IBr), arsenic pentafluoride ($AsF_5$), sodium (Na), silver borofluorodie ($AgBF_4$), silver perchlorate ($AgClO_4$), bisfluorosulphuryl peroxide ($FSO_2OOSO_2F$) and the like.

The compound to be polymerized in this invention by plasma-polymerization may be any gasifiable organic compound. However, a saturated hydrocarbon represented by the formula, $C_nH_{2n+2}$ wherein is an integer of 1 or more, is preferably used as the compound, because the oxidation of the treated acetylene polymers or the doped acetylene polymer can be prevented more effectively. The range of n in the above formula is not critical, but a range from 1 to 20, particularly 1 to 4, is preferred. If n is not less than 21, the vapor pressure of the compound decreases to make the control of the plasma-polymerization reaction difficult, whereas the smaller the n value, the higher the vapor pressure becomes and the easier the control of the polymerization reaction becomes. Particularly, when n is not more than 4, that is, when methane, ethane, propane, butane or the like is used, the treated acetylene polymer or doped acetylene polymer is excellent in resistance to oxidative deterioration and the oxidative deterioration is little observed even in a high temperature atmosphere at more than 100° C.

In the plasma-polymerization reaction according to this invention, the pressure in the reaction vessel is reduced to $10^{-3}$ Torr or less before initiating the polymerization. In order to remove oxygen as much as possible, the pressure is preferably reduced to $10^{-4}$ Torr or less, more preferably $10^{-5}$ Torr or less. The means for plasma-excitation is not critical and there may be used, for example, high frequency discharge, microwave discharge, low frequency discharge, direct current discharge and the like.

It is desirable to introduce a rare gas such as argon, helium, neon or the like simultaneously with the introduction of the compound to be polymerized in order to prevent the change of pressure in the reaction vessel and stabilize the reaction system.

Figure 2:
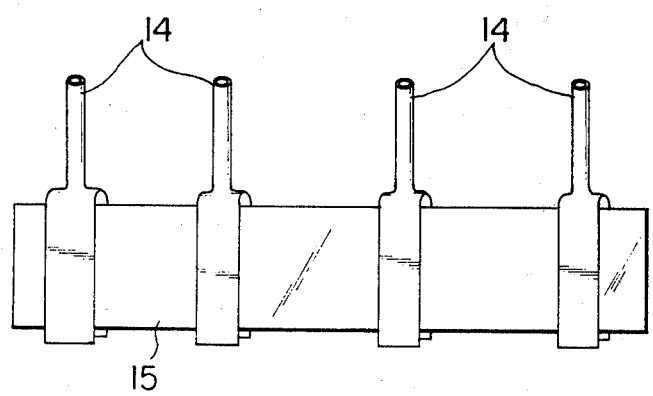
Figure 3:
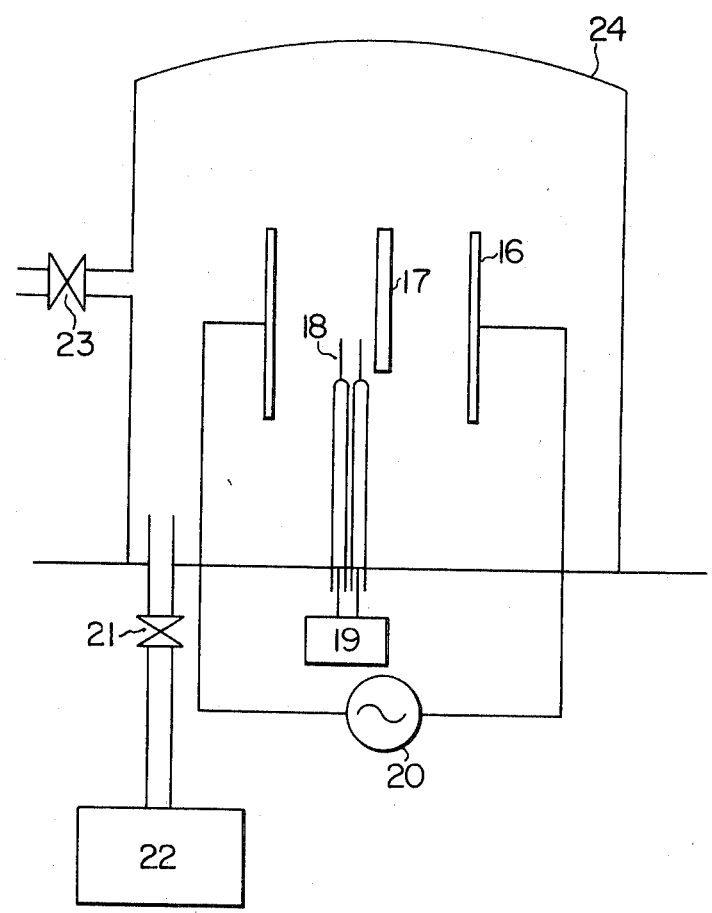

This invention is illustrated in more detail referring to the accompanying drawings, in which FIG. 1 is an example of a cylindrical plasma reactor which can be used in carrying out this invention, FIG. 2 is a schematic diagram of an acetylene polymer film equipped with a copper electrode, and FIG. 3 is a schematic diagram of a bell jar type plasma reactor which can be used in carrying out this invention.

The numbers used in the drawings have the following means: 1: inlet for compound to be polymerized, 2: inlet for rare gas, 3: high frequency power supply, 4: coil for plasma-excitation, 5: substrate on which film is to be formed, 6: valve for regulating evacuation rate, 7: gas outlet, 8: flow control valve for compound to be polymerized, 9: flow control valve for rare gas, 10: tank for compound to be polymerized, 11: tank for rare gas, 12: reactor body, 13: probes, 14: copper electrode, 15: film of acetylene polymer or doped acetylene polymer, 16: plate type electrodes arranged in parallel, 17: sample holder, 18: probes, 19: apparatus for measurement with probes, 20: alternating current power supply, 21: valve for regulating flow rate of compound to be polymerized, 22: tank for mixed gas of compound to be polymerized and rare gas, 23: valve for regulating evacuation rate, 24: heat-resistant glass bell jar.

The type of the plasma-polymerization reactor used in this invention is not critical. However, for example, the reactor shown in FIG. 1 is used. Into the reactor body 12 are introduced the compound to be polymerized and the rare gas through the inlet 1 and the inlet 2, respectively. Plasma is excited by means of the coil for plasma excitation 4, and a plasma polymer film is formed on the acetylene polymer or doped acetylene polymer 5. The reactor is maintained under desired reduced pressure by operating the valve 6.

The pressure in the reactor during the plasma reaction is preferably 0.5 Torr or less, particularly preferably 0.05 Torr or less, in order to make the oxygen-permeability lower by increasing the crosslinking density of the plasma polymer film.

In order that the film formed is protected from the influence of very high temperature brought about by the plasma and the influence of the plasma having a high electron temperature and a high electron density. In the case of, for example, a high frequency induction type plasma reactor, it is preferable to keep the acetylene polymer or doped acetylene polymer on which a plasma polymer film is to be formed (position A in FIG. 1) apart (distance x from the coil for plasma excitation 4 (position B in FIG. 1). Since the wall of a reactor is at a very high temperature in the neighborhood of the coil when a film is formed in the neighborhood of the position B, the temperature of the film becomes very high owing to heat conduction and radiation and the film tends to be thermally deteriorated, and further to be deteriorated by collision of high energy electrons and ions. The distace x may be varied depending upon the electron temperature and electron density of the plasma and cannot uniquely be determined. It is preferable to determine the distance x so that the electron temperature $T_e$ and the electron density $n_e$ at the position A (within 10 times the mean free path of molecule at the pressure during the plasma polymerization from the surface of the acetylene polymer or doped acetylene polymer) have the following relations:

$$4,000 K \leq T_e \leq 80,000 K \text{ and}$$

$$10^6 \text{ electrons/cm}^3 \leq n_e \leq 10^{11} \text{ electrons/cm}^3$$

$T_e$ and $n_e$ are measured by means of probes heated at a high temperature as disclosed in, for example, U.S. Pat. No. 4,242,188.

When the thickness of the plasma polymer film formed on the surface of an acetylene polymer or doped acetylene polymer reaches the desired one, introduction of the compound to be polymerized and the rare gas is stopped. The film thickness is determined by calculation from the plasma reaction time and the weight change of the acetylene polymer or doped acetylene polymer before and after the reaction considering the surface area and density, or it can also be determined by the light interference method when the acetylene polymer or doped acetylene polymer has a smooth surface. Further, the film thickness can also be measured by the method disclosed in Japenese Patent Application Kokai (Laid-Open) No. 14503/81 (Japanese Patent Application No. 88031/79). That is to say, in the plasma-polymerization reaction using probes for measuring plasma characteristics having a heating means, the surface temperature, $T_c$, of said probe is measured when the film formed by the plasma polymerization reaction begins to deposit on the surface of said probe. The weight of the plasma polymer film formed for a certain period of time at said temperature is measured. Plasma polymer film formation rate $K_r$ is calculated from the above weight measured and the relation between the surface temperature $T_c$ and the plasma polymer film formation rate $K_r$ is previously obtained. From this relation, $K_r$ can be calculated by measuring $T_c$ during the plasma-polymerization, and the film thickness can be determined therefrom.

This invention is illustrated below referring to the case where a high frequency induction type plasma reactor is used (FIG. 1) and the case where a plasma reactor in which plate type electrodes are arranged in parallel is used (FIG. 3). However, it is needless to say that this invention is not limited thereto.

Any conventional coil for high frequency plasma may be used as the coil for plasma-excitation and either one of the induction type or the volume type may be used.

EXAMPLES 1 to 4 AND COMPARATIVE EXAMPLE 1

Into a 500-ml glass vessel was charged 1.7 ml of titanium tetrabutoxide in a nitrogen atmosphere, and 30 ml of toluene was added thereto to dissolve the titanium tetrabutoxide, after which 2.7 ml of triethylaluminum was added thereto with stirring. The resultant mixture was subjected to reaction. This vessel was combined with a polymerization reactor, and the catalyst solution was coagulated with liquid nitrogen, and the nitrogen in the vessel was taken out by means of a vacuum pump. The temperature of the catalyst solution was elevated to room temperature to evaporate the nitrogen dissolved in the solution. Then, the solution was again coagulated with liquid nitrogen and then degased. Thereafter, the vessel was maintained at a temperature of a dry ice-methanol mixture, and the purified acetylene stored in the static state in a gas tank was introduced into this vessel at a pressure of not more than atmospheric pressure, upon which polymerization took place on the surface of the solution to form an acetylene polymer film. After 30 minutes from the introduction of acetylene, the vessel was separated from the polymerization reactor and nitrogen was introduced thereinto. The catalyst solution was taken out by a syringe in a nitrogen atmosphere, and the acetylene polymer film was washed sufficiently with dried and degased toluene. Subsequently, toluene was removed by a syringe and the film was then dried in vacuo to obtain an acetylene polymer film.

This acetylene polymer film consisted of 15% of trans form and 85% of cis form. The acetylene polymer film was subjected to thermal treatment at 100° C. for 3 hours to convert it to an acetylene polymer film consisting of 98% of trans form and 2% of cis form. The resulting polymer film had a specific resistance of $6 \times 10^5$ $\Omega$.cm.

Then, as shown in FIG. 2, four copper electrodes 14 were attached to the acetylene polymer film 15, and this was placed as a test specimen at the position of substrate 5 on which film is to be formed in the plasma reactor 12 shown in FIG. 1, and plasma-polymerization was carried out with the compound to be polymerized and the conditions shown in Table 1 to form a plasma polymer film having a thickness of 4,000 to 5,000 Å.

The acetylene polymer before the formation of a plasma polymer film was handled in an argon atmosphere in order to avoid the influence of oxygen. Changes of the specific resistance at 30° C. in the air of the acetylene polymer film having formed thereon a plasma polymer film are shown in Table 2, changes of the specific resistance of an acetylene polymer having no plasma polymer film thereon are also shown in Table 2 as Comparative Example 1.

EXAMPLES 5 to 8 AND COMPARATIVE EXAMPLE 2

An acetylene polymer film consisting of 98% of trans form and 2% of cis form was obtained in a similar manner to that in Example 1. The acetylene polymer film was immersed in a solution of 0.1 g of dichlorobis(benzonitrile)palladium in 20 ml of dried and de-oxygenated methylene chloride. After being allowed to stand at room temperature for 24 hours, the acetylene polymer film was washed with methylene chloride and dried under vacuum. The doped acetylene polymer film thus obtained had a specific resistance of $1.2 \times 10^3$ $\Omega$.cm. A plasma polymer film having a thickness of 4,000 to 5,000 Å was formed on the doped acetylene polymer film in the same manner as in Examples 1 to 4. The doped acetylene polymer film before the formation of a plasma polymer film was handled in an argon atmosphere. Changes of the specific resistance at 30° C. in the air of the doped acetylene polymer film having formed thereon a plasma polymer film are shown in Table 3. Changes of the specific resistance of the acetylene polymer film having no plasma polymer film thereon are also shown in Table 3 as Comparative Example 2.

TABLE 3

|  | Compound to be polymerized | After 24 hours (after 1 day) | After 168 hours (after 7 days) | After 360 hours (after 15 days) | After 720 hours (after 30 days) |
| --- | --- | --- | --- | --- | --- |
| Example 5 | Methane | 1.0 | 1.0 | 1.0 | 1.0 |
| Example 6 | n-Butane | 1.0 | 1.0 | 1.0 | 1.0 |
| Example 7 | n-Decane | 1.0 | 1.0 | 1.0 | 1.0 |
| Example 8 | Benzene | 1.04 | 1.33 | 2.85 | 4.61 |
| Comparative Example 2 | — | 2.7 | 10.3 | 15.6 | 21.7 |

Note:
The figures in the Table show the ratio of resistance to the initial resistance of each specimen.

EXAMPLES 9 to 12

TABLE 1

|  | Compound to be polymerized | Plasma-excitation power (W) | Pressure (Torr) | Reaction period (minute) | Flow rate of compound to be polymerized (STPcc/min) | Rare gas (argon) flow rate (STPcc/min) | $T_e$ (K) | $n_e$ (electrons/cm$^3$) |
| --- | --- | --- | --- | --- | --- | --- | --- | --- |
| Example 1 | Methane | 40 | 0.5 | 20 | 500 | 200 | 50,000 | $1.0 \times 10^9$ |
| Example 2 | n-Butane | 40 | 0.5 | 30 | 500 | 200 | 41,000 | $2.3 \times 10^8$ |
| Example 3 | n-Decane | 40 | 0.5 | 40 | 500 | 200 | 23,000 | $3.7 \times 10^7$ |
| Example 4 | Benzene | 40 | 0.5 | 5 | 500 | 150 | 5,000 | $1.0 \times 10^7$ |

TABLE 2

|  | Compound to be polymerized | After 24 hours (after 1 day) | After 168 hours (after 7 days) | After 360 hours (after 15 days) | After 720 hours (after 30 days) |
| --- | --- | --- | --- | --- | --- |
| Example 1 | Methane | 1.0 | 1.0 | 1.0 | 1.0 |
| Example 2 | n-Butane | 1.0 | 1.0 | 1.0 | 1.0 |
| Example 3 | n-Decane | 1.0 | 1.0 | 1.0 | 1.0 |
| Example 4 | Benzene | 1.06 | 1.43 | 2.25 | 5.18 |
| Comparative Example 1 | — | 0.35 | 1.03 | 2.13 | 23.6 |

Note:
The figures in the Table show the ratio of resistance to the initial resistance of each specimen.

A plasma polymerization film was formed on the dope acetylene polymers employed in Examples 5 to 8 by means of a plasma reactor in which plate type electrodes are arranged in parallel as shown in FIG. 3. The doped acetylene polymer film was fixed on a sample holder provided between two electrode plates.

A low frequency power supply of 20 kHz was used as a plasma excitation power supply. The conditions for plasma-polymerization were as shown in Table 4.

Changes of the specific resistance at 30° C. in the air of the doped acetylene polymer film having formed thereon a plasma polymer film are shown in Table 5.

TABLE 4

| | Compound to be polymerized | Plasma-excitation power (W) | Pressure (Torr) | Reaction time (min) | Flow rate of compound to be polymerized (STPcc/min) | Rare gas flow rate (STPcc/min) | $T_e$ ($\times 10^4$K) | $n_e$ (electrons/cm³) |
|---|---|---|---|---|---|---|---|---|
| Example 9 | Methane | 100 | 0.05 | 30 | 30 | 0 | 4.7 | $5.0 \times 10^8$ |
| Example 10 | n-Butane | 100 | 0.05 | 40 | 30 | 30 | 4.1 | $4.0 \times 10^8$ |
| Example 11 | n-Decane | 100 | 0.05 | 55 | 30 | 30 | 2.7 | $3.8 \times 10^8$ |
| Example 12 | Benzene | 100 | 0.05 | 12 | 30 | 100 | 1.7 | $1.0 \times 10^8$ |

TABLE 5

| | Compound to be polymerized | After 24 hours (after 1 day) | After 168 hours (after 7 days) | After 360 hours (after 15 days) | After 720 hours (after 30 days) |
|---|---|---|---|---|---|
| Example 9 | Methane | 1.0 | 1.0 | 1.0 | 1.0 |
| Example 10 | n-Butane | 1.0 | 1.0 | 1.0 | 1.0 |
| Example 11 | n-Decane | 1.0 | 1.0 | 1.0 | 1.0 |
| Example 12 | Benzene | 1.1 | 1.34 | 2.20 | 3.25 |

Note:
The figures in the Table show the ratio of resistance to the initial resistance of each specimen.

What is claimed as new and desired to be secured by Letters Patent of the United States is:

1. A process for treating an acetylene polymer or a doped acetylene polymer, which comprises:
   plasma polymerizing a gasifiable organic compound under reduced pressure by plasma excitation of said organic compound; and
   depositing a polymer film on a solid surface of the acetylene or doped acetylene polymer positioned in said polymerization reaction system.

2. The process according to claim 1, wherein the gasifiable organic compound is a saturated hydrocarbon represented by the formula, $$C_nH_{2n+2}$$

wherein n is an integer of 1 or more.

3. A process according to claim 2, wherein the n is an integer of from 1 to 20.

4. A process according to claim 2, wherein the saturated hydrocarbon is methane, ethane, propane or butane.

5. The process according to claim 1, wherein the plasma polymerization reaction is carried out at a reduced pressure of 0.5 Torr or less.

6. The process according to claim 1, wherein the plasma polymerization reaction is carried out at a reduced pressure of 0.05 Torr or less.

7. The process according to claim 1, wherein the acetylene polymer or the doped acetylene polymer is in the form of a film or a fiber.

8. The process according to claim 1, wherein the doped acetylene polymer is obtained by treating the acetylene polymer with a solution of a Platinum Group metal complex in an organic solvent or a solution of a carbonium salt or oxonium salt in an organic solvent.

9. The process according to claim 1, wherein the doped acetylene polymer is obtained by doping an acetylene polymer with HBr, Cl₂, Br₂, I₂, ICl, IBr, AsF₅, Na, AgBF₄, AgClO₄ or FSO₂OOSO₂F.

10. The process according to any of claims 1 and 2 to 9, wherein the electron temperature $T_e$ and the electron density $n_e$ during the plasma-polymerization reaction have the following relationships:

$$4{,}000K \leq T_3 \leq 80{,}000K \text{ and}$$

$$10^6 \text{ electrons/cm}^3 \leq n_e \leq 10^{11} \text{ electrons/cm}^2$$

at a distance within 10 times the mean free path of the plasma molecules at the pressure of the plasma-polymerization from the surface of the acetylene polymer or doped acetylene polymer.

11. A process for treating an acetylene polymer or a doped acetylene polymer, which comprises:
   plasma polymerizing a gasifiable organic compound under reduced pressure by plasma excitation of said organic compound such that the electron temperature $T_e$ and the electron density $n_e$ during the plasma polymerization obey the following relationships:

$$4{,}000K \leq T_e \leq 80{,}000K \text{ and}$$

$$10^6 \text{ electrons/cm}^3 \leq n_e \leq 10^{11} \text{ electrons/cm}^3$$

at a distance which is within 10 times the mean free path of the plasma molecules under pressure during plasma polymerization from the surface of the acetylene or doped acetylene polymer; and
   depositing a polymer film on a solid surface of the acetylene or doped acetylene polymer placed within the polymerization reaction system.

* * * * *